(No Model.)

C. G. PURDY.
ANTISEPTIC AIR VENT AND OVERFLOW FOR FILTERS.

No. 448,671. Patented Mar. 24, 1891.

WITNESSES:

INVENTOR:
C. G. Purdy
BY
Munn & Co.
ATTORNEYS

UNITED STATES PATENT OFFICE.

CHARLES G. PURDY, OF BROOKLYN, NEW YORK.

ANTISEPTIC AIR-VENT AND OVERFLOW FOR FILTERS.

SPECIFICATION forming part of Letters Patent No. 448,671, dated March 24, 1891.

Application filed June 6, 1890. Serial No. 354,494. (No model.)

*To all whom it may concern:*

Be it known that I, CHARLES G. PURDY, of Brooklyn, in the county of Kings and State of New York, have invented a new and Improved Antiseptic Air-Vent and Overflow for Filters, of which the following is a full, clear, and exact description.

My invention has for its object to provide air-vent and overflow devices for fluid-filters which will give free vent of filtered fluid while excluding injurious germs from the filtered-fluid reservoir and at the same time allow free outflow of surplus filtered fluid without admitting impure atmospheric air to the reservoir.

The invention consists in certain novel features of construction of the air-vent and overflow devices, and in their combination with the filtered-fluid reservoir of a filter, all as hereinafter described and claimed.

Reference is to be had to the accompanying drawings, forming a part of this specification, in which similar letters and figures of reference indicate corresponding parts in all the views.

Figure 1:
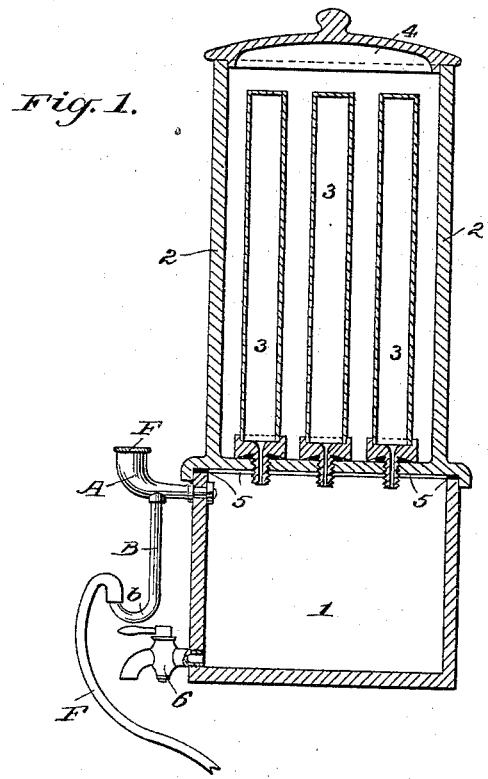
Figure 2:
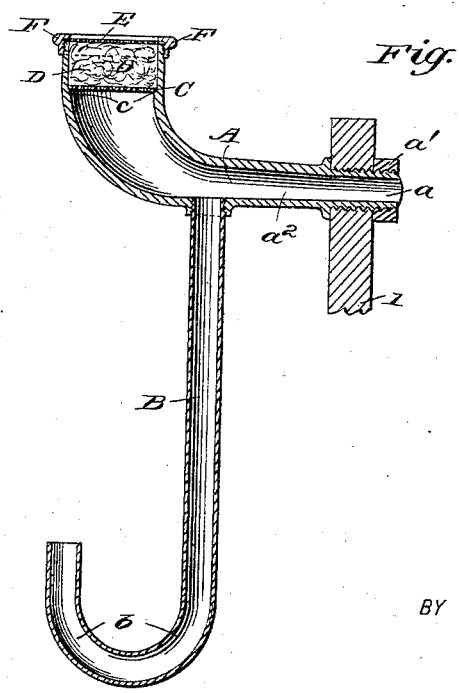

Figure 1 is a vertical sectional elevation of a filter provided with my improved antiseptic air-vent and overflow device, and Fig. 2 is an enlarged vertical sectional view of the air-vent and overflow device and a portion of the filter-wall to which it is attached.

My improved air-vent and overflow device is applicable to the filtered-fluid reservoir of any form or style of filter. By way of illustration I show the device connected to the filtered-fluid reservoir 1 of a filter of ordinary general form, having a superposed unfiltered-fluid chamber 2, which is provided with a series of tubes 3, through which the liquid filters into the reservoir. The upper chamber 2 has a suitable cover or lid 4. The joint between the chamber and reservoir may be made air-tight in any approved manner, as by grinding or turning the joint-faces; but an ordinary rubber or other suitable packing 5 is preferably used to make an inexpensive and practically air-tight joint between the chamber and reservoir. Any suitable faucet or valve device 6 may be used to draw off the filtered fluid from the reservoir.

A very serious objection to many forms of filters is that the air admitted to give vent of the filtered fluid from the reservoir is not properly sterilized and carries injurious germs into the filtered fluid. Furthermore, suitable provision has not been made for overflow of surplus fluid from the reservoir while at the same time excluding impure atmospheric air therefrom. My improvement obviates both these difficulties, and is particularly described as follows:

The air-vent and overflow device in its preferred form is made with two main parts, an upper hollow or tubular portion or head-piece A, which carries the air-sterilizing material or substance and performs both functions of providing an air-vent and overflow, and a lower pendent pipe portion B, which connects with the head-piece and is upbent at its lower end $b$ to form a water or fluid-seal trap against admission of air through it to the filtered-fluid reservoir. I prefer to make the head-piece A with a shouldered and threaded inner end $a$, which screws into the filter-reservoir 1 near its top and receives a retaining-nut $a'$ inside the reservoir. The head-piece is by preference gradually enlarged toward its outer end, which is turned or curved upward, and near its top is provided with a wire-gauze or other suitable perforated retainer-plate C, which preferably rests upon a shoulder $c$ of the head-piece and sustains a suitable quantity of sterilized cotton D or other proper air purifying or sterilizing substance or compound at the outer upper part of the head-piece and above the level of its hollow stem portion $a^2$, which serves both as an air and fluid overflow-passage. Hence the sterilizing compound or substance is out of danger of being wet or damaged by the overflow of fluid from the reservoir. I prefer to place another wire-gauze or perforated plate or disk E on top of the cotton or air sterilizing substance or compound and to secure both disks or plates C E and the sterilizing substance within the top of the head-piece by an annular cap F, screwed onto the head-piece and clamping the upper plate or disk E of the device.

The overflow and trap pipe B $b$ is screwed or otherwise fitted into the horizontal stem $a^2$ of the head-piece and at the lower upturned extremity of its trap $b$ is adapted to receive a rubber or other suitable overflow or drip pipe F, the lower end of which will rest in a vessel placed below the filter to conduct thereto the liquid overflowing from the filter-reservoir.

When the filter is in use, the trap $b$ of the overflow-pipe B will be charged and kept full of water. Hence no air can pass through this pipe into the head-piece A and thence to the reservoir, and all the air giving vent to the filtered fluid from the reservoir 1 as the faucet 6 is opened must pass to the reservoir through the sterilized cotton or substance D in the head-piece, and thereby be freed from disease-germs, which are retained by the cotton. Hence while free vent is given the fluid from the faucet impurities are positively excluded from the filtered-fluid reservoir, and the filtered water, vinegar, fruit-juice, or other fluid will remain in pure and healthful condition for use. Any overflow of filtered fluid from the reservoir 1 will pass off through the stem $a^2$ of the head-piece A to the pipe B and thence past the trap $b$ to the pipe F, as will readily be understood.

Having thus described my invention, I claim as new and desire to secure by Letters Patent—

1. An air-vent and overflow for filters, comprising a tubular or hollow body adapted for connection to a filter and provided at its outer part with an air-sterilizing substance, and an overflow-pipe connected to the body, substantially as described.

2. An air-vent and overflow for filters, comprising a tubular or hollow body adapted for connection to a filter and provided at its outer part with an air sterilizing substance, and an overflow-pipe connected to the body and provided with a fluid-seal trap, substantially as described.

3. An air-vent and overflow for filters, comprising a tubular or hollow body adapted for connection to a filter and having a stem and an upturned outer part provided with an air-sterilizing substance above the level of the stem-opening, and an overflow-pipe connected to the body and provided with a fluid-seal trap, substantially as described.

4. In a filter, the combination, with the filtered-fluid reservoir, of an air-vent and overflow device comprising a tubular or hollow body fitted to the reservoir and provided at its outer part with an air-sterilizing substance, an overflow-pipe connected to the body and provided with a fluid-seal trap, and a drain-pipe connected to the outer end of the trap, substantially as described.

5. An air-vent and overflow device consisting of a tubular or hollow body A, adapted for connection to a fluid-reservoir and having an upturned end, perforated plates C E in the body, sterilized cotton or substance D between said plates, a cap F, retaining the parts C D E, and an overflow-pipe B, connected to the body-stem and having a fluid-seal trap, substantially as described.

CHARLES G. PURDY.

Witnesses:
HENRY L. GOODWIN,
EDGAR TATE.